Patented Nov. 19, 1940

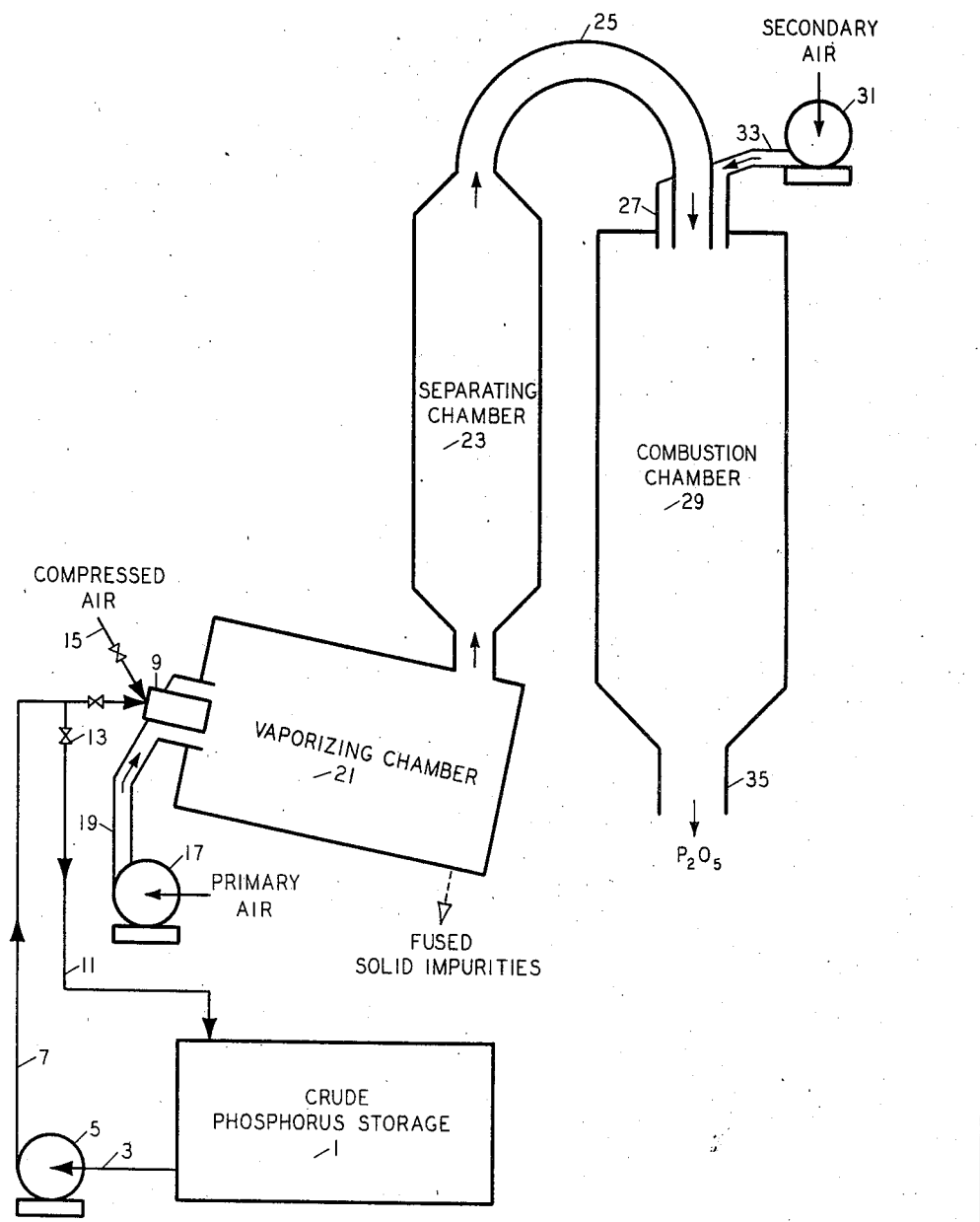

2,221,770

UNITED STATES PATENT OFFICE 2,221,770

OXIDATION OF CRUDE PHOSPHORUS

Laurence H. Almond, Nashville, Tenn.

Application September 29, 1939, Serial No. 297,113
2 Claims. (Cl. 23—165)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a process of treating crude phosphorus and more particularly where such crude phosphorus carries substantial proportions of solid impurities and water.

The principal object of this invention is to provide a process of treating crude phosphorus containing a substantial proportion of solid impurities in order that oxidized phosphorus may be obtained substantially free from such impurities. Another object of this invention is to provide a process for the separation of solid impurities from crude phosphorus wherein such solid impurities are collected and withdrawn in a fused state. Other objects of this invention include the provision of a process for vaporizing elemental phosphorus from a crude phosphorus mixture and after oxidation of only a minor part of the phosphorus separating the solid impurities in a fused state from a minimum amount of combustion products carrying elemental and oxidized phosphorus.

Phosphate reduction furnace gas from either a blast furnace or an electric furnace usually carries a substantial quantity of finely divided phosphate reduction furnace charging stock entrained therein and elemental phosphorus condensed therefrom usually includes these solid impurities where indirect cooling is employed. Water is also present in the crude phosphorus condensate where direct cooling is employed. These solid impurities continue to persist and appear in phosphorus compounds subsequently produced from such crude phosphorus unless such solid impurities are separated from the reduction furnace gas before the condensation of the phosphorus therefrom or during the treatment of the crude phosphorus but prior to the separation of the phosphorus compounds which are being produced. The separation of the solid impurities from the reduction furnace gas may be accomplished by either mechanical or electrical means, but either alternative is expensive because of the relatively low concentration of phosphorus and solid impurities in such case and the character of the apparatus involved. The elemental phosphorus in such a reduction furnace gas may be readily condensed so that it carries out with it the solid impurities. The crude phosphorus resulting therefrom may be then readily processed without requiring treatment of the remaining constituents of the furnace gas which make up 85% to 95% of the same. It has been proposed to treat such crude phosphorus and subject the treated material to conditions which allow the distillation of the elemental phosphorus therefrom with the resulting separation of the solid impurities as a residue, the elemental phosphorus being condensed in a relatively fused form which is adapted to conversion into desired phosphorus compounds. The instant problem was to simultaneously effect the conversion of the elemental phosphorus in crude phosphorus to a mixture of elemental phosphorus and oxidized phosphorus and to separate the elemental phosphorus therefrom.

I have discovered a process of separating solid impurities from crude phosphorus containing the same by establishing in a vaporizing chamber an atmosphere containing vapors of elemental and oxidized phosphorus, by continuously injecting the crude phosphorus and air into said chamber, by maintaining the quantity of air supplied at such amount that the oxygen content thereof is only a minor part of the amount theoretically required for complete oxidation of all the phosphorus but sufficient to maintain the temperature of the partially oxidized combustion products above the fusing point of the solid impurities associated therewith, by maintaining said combustion products in said vaporizing chamber for a sufficient length of time for a substantial portion of the fused solid impurities to separate therefrom and collect in the bottom of said chamber, by withdrawing said fused solid impurities from said vaporizing chamber, by discharging the combustion products containing elemental and oxidized phosphorus from said vaporizing chamber, and by completing the oxidation of the elemental phosphorus in said combustion products outside of said vaporizing chamber by means of air separately supplied.

In the accompanying drawing, which forms a part of the specification, the figure is a diagrammatical, vertical, sectional view of one form of apparatus for the embodiment of my invention. A crude phosphorus storage tank 1 supplies phosphorus, along with solid impurities and water associated therewith, through line 3 to the intake of pump 5 which discharges the crude phosphorus through valved line 7 to the burner 9. The valved line 9 is connected to storage tank 1 through line 11 in which is placed a relief valve 13 to permit a continuous circulation of the crude phosphorus in order that a supply of substantially uniform quality may be delivered to burner 9. This is necessary due to the tendency of the solid impurities and water contained in crude phosphorus to settle therefrom. The burner 9 is supplied with compressed air through valved line 15 to effect atomization of the crude phosphorus delivered to burner 9 through valved line 7. The atomized crude phosphorus together with primary air supplied to burner 9 by blower 17 through line 19 is delivered into vaporizing chamber 21 to produce primary combustion products containing elemental and oxidized phosphorus. The amount of primary air used, including the amount of compressed air required for atomization, is only a minor part of the oxygen required for the complete oxidation of the phosphorus in the crude phosphorus charged, but at the same time is an amount sufficient to raise the temperature of the products in the chamber 21 to at least the fusion point of the solid impurities carried by the crude phosphorus. With a vaporizing chamber 21 of proper dimensions to permit sufficient time for the fused solid impurities to separate therein, a substantial proportion of such impurities is separated out in the bottom of chamber 21 and are withdrawn from time to time as fused solid impurities from the bottom of said chamber. Otherwise, a portion of such solid impurities is separated out and collected in the bottom of chamber 21 and the primary combustion products carrying the remainder of the solid impurities are discharged into a superposed separating chamber 23 of such dimensions that the velocity of the primary combustion products passing therethrough is sufficiently reduced to permit substantially all of the remaining solid impurities to separate from such combustion products and accumulate with the previously separated fused solid impurities in the bottom of chamber 21. The primary combustion products from vaporizing chamber 21 are discharged through conduit 25 into burner 27 to combustion chamber 29. Secondary air for completing the oxidation of the elemental phosphorus in the primary combustion chamber is supplied to burner 27 by blower 31 through line 33. The completely oxidized phosphorus is discharged from combustion chamber 29 through conduit 35. Thereafter the oxidized phosphorus contained therein or other phosphorus derivatives which may be produced are separated.

It is evident that there are numerous factors which will influence conditions for the most satisfactory operation of my invention, the actual limits of which cannot be established except by a knowledge of the character of the crude phosphorus, particularly in respect to the nature and extent of the solid impurities and the amount of water which is carried with the same.

Typical crude phosphorus obtained by the direct condensation of elemental phosphorus from phosphate reduction furnace gas contains 15% solid impurities and 35% water. The percentage of both solid impurities and water may vary over a wide range, depending upon the conditions of treatment of the phosphate reduction furnace gas and treatment of the crude phosphorus obtained therefrom, particularly in respect to the reduction of the water content thereof. With crude phosphorus carrying substantial percentages of solid impurities and water there is always a tendency for gradual separation of at least a part of these constituents from the mixture. Consequently, in treating the crude phosphorus in plant sized scale apparatus it is desirable to maintain the temperature of the crude phosphorus above the melting point of elemental phosphorus and to feed the charge from a circulating system wherein the constituents of the crude phosphorus mixture are maintained substantially uniformly distributed throughout the mixture. Although the character of the solid impurities present will be influenced largely by the physical properties of the constituents of the phosphate furnace charging stock used, it will be generally of a character such that it will have a fusing point between 900° and 1100° C.

In the present invention the crude phosphorus is delivered into a vaporizing chamber, preferably by air injection, wherein vaporization of all of the elemental phosphorus is effected and the oxidation of only a minor part of the vaporized elemental phosphorus is effected by the use of a limited amount of primary air. A small portion of this primary air is supplied by the air used to inject the crude phosphorus mixture but the major portion is generally supplied at the zone of injection by independent means. The amount of the total primary air used is such that the oxygen content thereof, is substantially sufficient to oxidize only a minor part of the elemental phosphorus but, at the same time, sufficient to raise the temperature of the primary combustion products to the melting point of the solid impurities carried by the crude phosphorus. With crude phosphorus of the character indicated in the preceding paragraph, the amount of air required for this purpose is between 30% and 40% of the air required to supply sufficient oxygen to oxidize all of the elemental phosphorus.

The vaporizing chamber used may be of sufficient capacity to obtain a velocity of primary combustion products sufficiently low to permit the fused solid impurities carried by the same to separate out in the bottom of said vaporizing chamber and be periodically withdrawn in a fused state therefrom. Substantially the same result may be effected by the use of a smaller vaporizing chamber and a superposed separating chamber with a part of the fused solid impurities separating out in the vaporizing chamber and substantially all the remainder of the fused solid impurities separating out in the separating chamber, with all of the fused solid impurities so separated collecting in the bottom of the vaporizing chamber. The mixture containing elemental and oxidized phosphorus as discharged from either the vaporizing chamber wherein substantially all the solid impurities have separated out or from the separating chamber may be then delivered to a combustion chamber wherein the remainder of the elemental phosphorus is completely oxidized. The operation of a plant sized apparatus embodying this invention for a considerable length of time has shown that it is particularly effective for the separation of solid impurities from crude phosphorus and the production of gaseous mixtures carrying oxidized elemental phosphorus substantially free from said solid impurities.

It will be seen therefore that this invention actually may be carried out by the use of various modifications and changes, without departing from its spirit and scope.

I claim:

1. A process of treating crude phosphorus containing solid impurities which comprises establishing in a vaporizing chamber an atmosphere containing vapors of elemental and oxidized phosphorus, continuously injecting the crude phosphorus and air into said chamber, maintaining the quantity of air supplied at such amount that the oxygen content thereof is only a minor part of the amount theoretically required for complete oxidation of all the phosphorus but sufficient to maintain the temperature of the partially oxidized combustion products above the fusing point of the solid impurities associated therewith of the order of 900° to 1100° C., maintaining said combustion products in said vaporizing chamber for a sufficient length of time for a substantial portion of the fused solid impurities to separate therefrom and collect in the bottom of said chamber, withdrawing said fused solid impurities from said vaporizing chamber, discharging the combustion products containing elemental and oxidized phosphorus from said vaporizing chamber, and completing the oxidation of the elemental phosphorus in said combustion products outside of said vaporizing chamber by means of air separately supplied.

2. A process of treating crude phosphorus containing solid impurities which comprises establishing in a vaporizing chamber an atmosphere containing vapors of elemental and oxidized phosphorus, continuously injecting the crude phosphorus and air into said chamber, maintaining the quantity of air supplied at such amount that the oxygen content thereof is only a minor part of the amount theoretically required for complete oxidation of all the phosphorus but sufficient to maintain the temperature of the partially oxidized combustion products above the fusing point of the solid impurities associated therewith of the order of 900° to 1100° C., discharging the combustion products from said vaporizing chamber into a superposed separating chamber, maintaining said combustion products in said vaporizing chamber and said separating chamber for a sufficient length of time for a substantial portion of the fused solid impurities to separate therefrom and collect in the bottom of said vaporizing chamber, withdrawing said fused solid impurities from said vaporizing chamber, discharging the combustion products containing elemental and oxidized phosphorus from said separating chamber, and completing the oxidation of the elemental phosphorus in said combustion products outside of said vaporizing chamber and said separating chamber by means of air separately supplied.

LAURENCE H. ALMOND.

CERTIFICATE OF CORRECTION.

Patent No. 2,221,770.  November 19, 1940.

It is hereby certified that error appears in the above numbered patent requiring correction as follows: In the grant, lines 1 and 13, and in the heading and signature to the printed specification, name of inventor, for "Laurence H. Almond" read --Lawrence H. Almond--; and that the said Letters Patent should be read with this correction therein that the same may conform to the record of the case in the Patent Office.

Signed and sealed this 24th day of December, A. D. 1940.

(Seal)

Henry Van Arsdale,
Acting Commissioner of Patents.